United States Patent
Wang

[19]

[11] Patent Number: 5,946,748
[45] Date of Patent: Sep. 7, 1999

[54] MULTIPURPOSE BODY-TURN-OVER APPARATUS

[76] Inventor: Yi-Lung Wang, No.34-2, Lane 166, An Lo Road, Sec. 2, Chidu, Keelung City, Taiwan

[21] Appl. No.: 09/025,126

[22] Filed: Feb. 17, 1998

[51] Int. Cl.⁶ .................................................. A61G 7/10
[52] U.S. Cl. ........................... 5/81.1 R; 5/83.1; 5/85.1; 5/87.1; 5/89.1; 212/281; 212/345; 212/901
[58] Field of Search ................. 5/81.1 R, 83.1, 5/85.1, 86.1, 88.1, 89.1, 84.1, 87.1; 212/281, 901, 345; 254/231

[56] References Cited

U.S. PATENT DOCUMENTS

| | | | |
|---|---|---|---|
| 274,527 | 3/1883 | Stelle et al. | 5/87.1 |
| 1,961,119 | 5/1934 | Ettinger | 5/89.1 |
| 1,978,999 | 10/1934 | Jones | 212/901 X |
| 2,792,945 | 5/1957 | Brenny | 5/87.1 X |
| 4,202,063 | 5/1980 | Murray | 5/87.1 |
| 5,068,931 | 12/1991 | Smith | 5/84.1 |
| 5,161,267 | 11/1992 | Smith | 5/88.1 X |
| 5,195,726 | 3/1993 | Kaner | 212/901 X |
| 5,333,333 | 8/1994 | Mah | 5/87.1 |
| 5,406,658 | 4/1995 | Olkkonen et al. | 5/84.1 X |
| 5,544,371 | 8/1996 | Fuller | 5/85.1 |
| 5,673,443 | 10/1997 | Marmor | 5/85.1 X |
| 5,758,371 | 6/1998 | Van Dyke et al. | 5/87.1 X |
| 5,802,633 | 9/1998 | Capaldi | 5/83.1 X |

FOREIGN PATENT DOCUMENTS

| | | | |
|---|---|---|---|
| 13665 | 6/1909 | United Kingdom | 5/87.1 |

*Primary Examiner*—Michael F. Trettel
*Assistant Examiner*—Robert G. Santos
*Attorney, Agent, or Firm*—Dougherty & Troxell

[57] ABSTRACT

Disclosed is a multipurpose body-turn-over apparatus mainly including an elevator support, a cantilever elevator fixed to the elevator support, a driving mechanism mounted on the cantilever elevator, and a controller for setting operating time and speed, reverse, and pause of the driving mechanism, as well as adjusting height of the elevator support. The driving mechanism drives a driven assembly to reciprocate, so that ropes hanging from two ends of the driven assembly to connect a net thereto are alternately pulled up and lowered, causing a patient lying on the net to turn over regularly to avoid bedsore due to lying on bed for a prolonged time. Means other than the net may also be selectively connected to the ropes to help patient do rehabilitation exercises or complete skeletal traction. The apparatus may be designed into heavy-duty or light model to meet different requirements and can be freely moved for use with different sick beds.

9 Claims, 9 Drawing Sheets

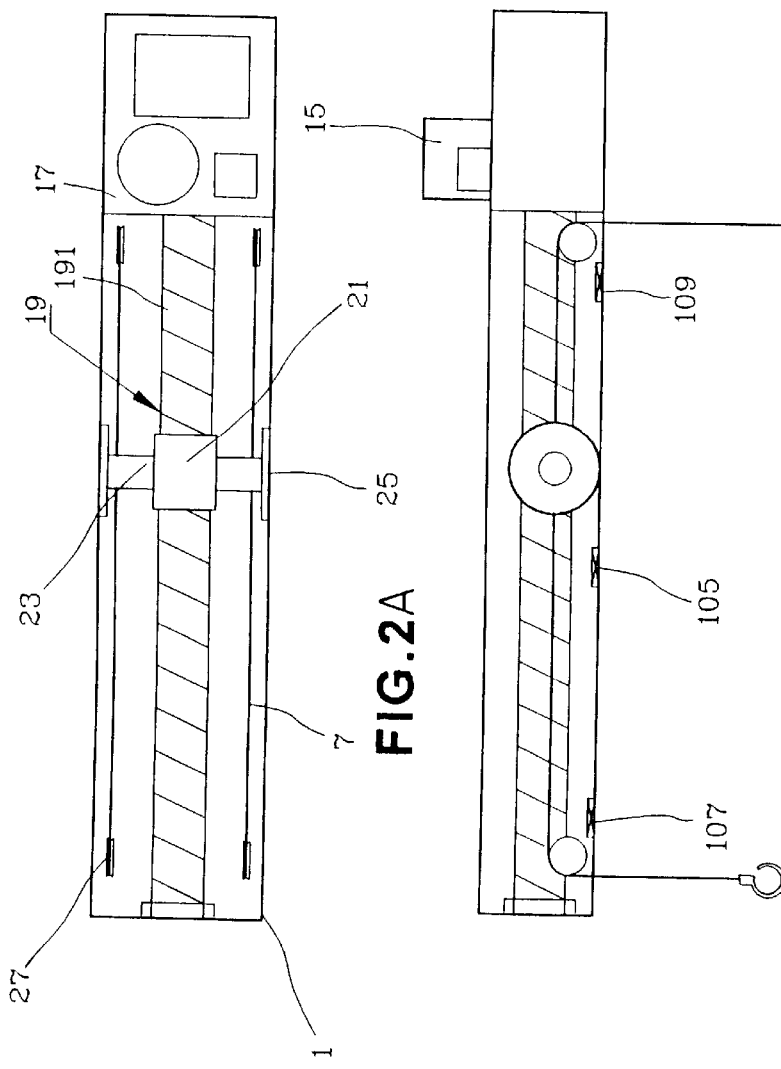
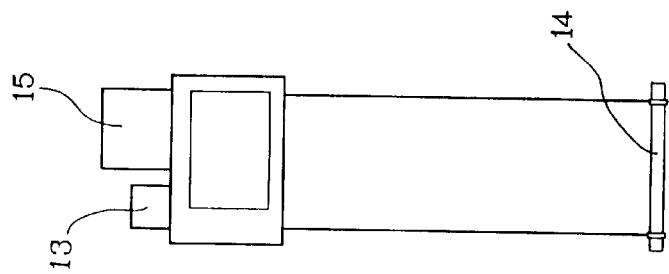

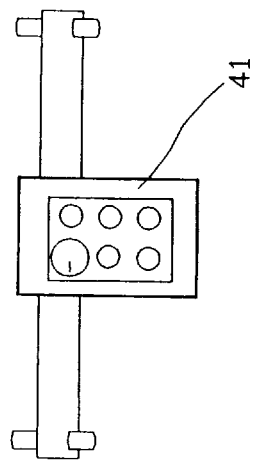
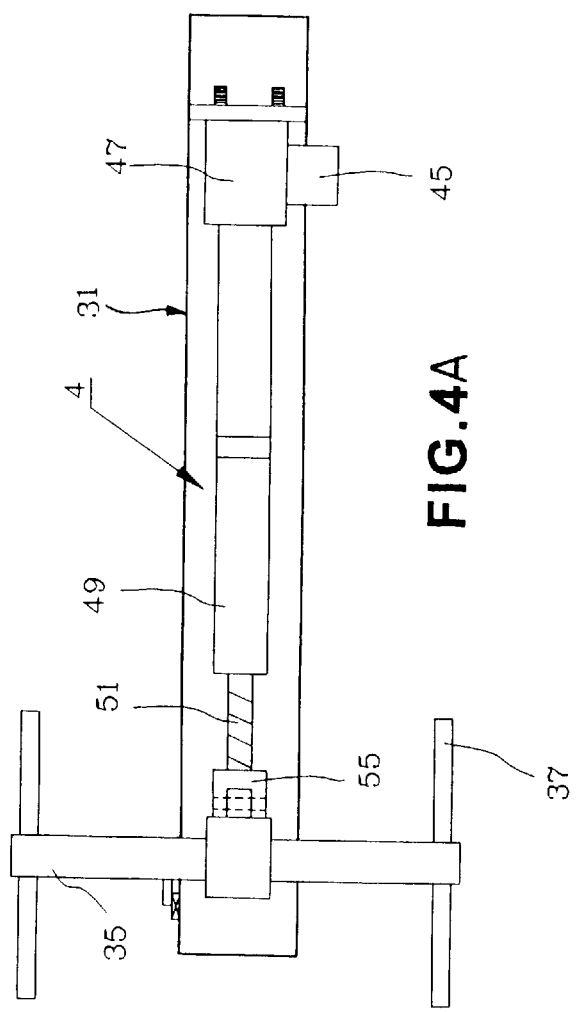
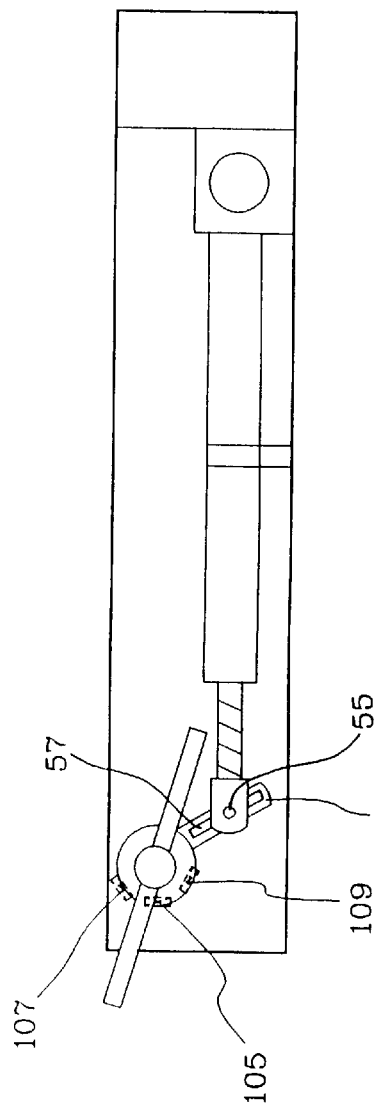
FIG. 4C
FIG. 4A
FIG. 4B

MULTIPURPOSE BODY-TURN-OVER APPARATUS

BACKGROUND OF THE INVENTION

The present invention relates to a medical apparatus for turning a patient over on a sick bed, and more particularly to a multipurpose body-turn-over apparatus which uses a motor-driven assembly to pull or lower ropes having a net connected to lower ends, so that a patient lying on the net can be automatically turned over regularly. Other treatment means may also be selectively connected to the ropes to help the patient do rehabilitation exercises, etc.

There are many aged, sick, and invalid people lying on bed for a prolonged time and need nurses to regularly turn them over to avoid bedsore and other mental problem resulting from confinement to bed. There are automatic machines developed to help patients turn over and do rehabilitation exercises on sick beds. Most of these sick beds with such automatic machines include two lateral halves that are alternately lifted and lowered by motors or hydraulic cylinders to help patients turn over. However, patients' backs always keep close contact with the sick beds when they are turned over with the help of inclined bed surfaces. Therefore, such sick beds have only limited effect in preventing bedsore. Besides, these sick beds with automatic machines to help patients turn over have complicate structure and are expensive. Not all the patients can afford to buy such a sick bed for use at home. Moreover, such sick beds are usually designed for use by one single patient each. The automatic machines are fixedly mounted on individual sick beds and can not be freely moved to cooperate with multiple sick beds for use in an economical manner.

SUMMARY OF THE INVENTION

It is therefore a primary object of the present invention to provide a multipurpose body-turn-over apparatus which can be freely moved for use with any sick bed to help a patient turn over on the sick bed and do rehabilitation exercises to effectively avoid bedsore.

Another object of the present invention is to provide a multipurpose body-turn-over apparatus which includes heavy-duty and light models to provide patients with more choices.

To achieve the above objects, the present invention mainly includes an elevator support having a cantilever elevator to which a driving mechanism is attached. The driving mechanism includes a controller, a motor, a reduction gearbox, and a driven assembly. Ropes are hung from two ends of the driven assembly. Limit switches are provided at predetermined positions in the travel of the driven assembly, so that ropes hung from two ends of the driven assembly are pulled upward or lowered alternately by the driving mechanism. A net is connected at two sides to lower ends of the ropes for a patient to lie thereon. Whereby when the ropes connected to two sides of the net are alternately pulled upward and lowered, the patient lying on the net is regularly turned over without close contacting with the sick bed. Therefore, bedsore can be effectively avoided. Alternatively, means other than the net can be connected to the lower ends of ropes to help patient do rehabilitation exercises or other treatment, such as skeletal traction.

In the heavy-duty model of the present invention, the driven assembly reciprocates in a linear movement and includes a screw stem connected at one end to the reduction gearbox. An internally threaded collar is put around the screw stem to fix a shaft perpendicular to the screw stem. Two wheels are connected to two ends of the shaft and will rotate when the shaft and the collar move along the rotating screw stem. Each end of the shaft has two ropes connected thereto to extend in opposite directions. Each rope passes a pulley to hang down from one corner of the cantilever elevator. The limit switches are preferably mounted at two ends and a middle point of the travel of the driven assembly for the wheels connected to the shaft to reverse or reset when they reach points limited by the limit switches.

In the light model of the present invention, the driven assembly reciprocates to swing two pairs of arms. In this model, the driven assembly includes an internally threaded sleeve connected at a rear end to the reduction gearbox and a front end to a screw stem. When the sleeve is rotated by the motor and the reduction gearbox, the screw stem is driven to reciprocate and push or pull a push bar slidably connected to a front end of the screw stem. The push bar is connected at a root portion to a shaft extending perpendicularly to the screw stem. Each end of the shaft has two arms perpendicular to the shaft and extending in opposite directions. Hangers are provided near outer ends of the arms for the ropes to hang therefrom. Limit switches are provided around the shaft at predetermined positions.

When the screw stem pushes or pulls the push bar, the shaft is rotated and the arms connected to two ends of the shaft swing like a seesaw. The limit switches limit the angles within which the arms can swing.

With the above arrangements, the body-turn-over apparatus of the present invention can be freely moved to any desired position and the elevator thereof can be freely adjusted to any desired height. When the motor is started, the driven assembly causes the net, which is connected to the lower ends of the ropes hanging from the driven assembly mounted on the elevator and has a patient lying thereon, to be alternately pulled upward or lowered at two sides for a desired time period, so that the patient lying thereon can be turned over leftward and rightward in a regular manner. Means other than the net can also be selectively connected to the ropes to help the patient do rehabilitation exercises and other treatments.

After the elevator is adjusted to a desired height relative to the sick bed and the net is connected to the ropes for use, the whole body-turn-over apparatus can be easily operated to achieve following functions:

1. Spread a net made of pliable, air-pervious and washable material, such as cotton, on a bed surface before letting a patient lie on the net. The net may have a size large enough to extend longitudinally from the patient's chest to buttocks and transversely from one side of the bed to another side thereof. Two bars are extended through two longitudinal sides of the net and fixed thereto. There are connecting holes formed on the bars for the ropes to connect thereto. When the ropes connected to two sides of the net are alternately pulled upward and lowered within a small distance, the patient is turned over repeatedly. Or, the net can be fixed to an inclined position for the patient to lie on the side to expose the patient's back to the air and avoid bedsore.

2. Two grip bars instead of a net may be connected to the ropes for the patient on the sick bed to grip or rest legs, so that the patient's hands or legs may move along with the upward pulled or lowered ropes as doing a rehabilitation exercise.

3. Other medical treating means, such as a fracture fixation means, may be connected to the ropes to help patient complete the skeletal traction.

4. It is a difficult work for a thin and small nurse to take care of a tall and big patient, especially when the nurse tries to clean the patient's back or replace a diaper for the patient. However, by manually setting the body-turn-over apparatus of the present invention, the patient lying on the net can turn over to lie on the side for the nurse to easily complete the back cleaning or diaper replacement while only turning the patient over twice will be sufficient. That is, turn the patient over once and release the net to clean the patient's buttocks; remove the used diaper away and spread a fresh and folded diaper beneath one buttock; turn the patient over again; unfolded the fresh diaper beneath another buttock; clean the buttocks again; and let the patient to lie on the back again and fix the diaper in place.

5. The apparatus of the present invention is equipped with a microcomputer-operated controller to work in an automatic and timing manner. When the operating time period and speed are set, the patient lying on the net may lie on the side for a preset period of time and then automatically turn over to lie on the back or on the other side until the set time period is reached. By then, the patient will lie on the back and a music bell rings to alarm the nurse. Then, the apparatus may be removed from the sick bed to another place.

6. The heavy-duty and light models can be selectively used to help patients of different weights. Particularly, the heavy-duty model can also serve as a hoist to move the patient from one place to another in order to facilitate moving or cleaning of the sick bed.

BRIEF DESCRIPTION OF THE DRAWINGS

The structure and the operation of the present invention can be best understood by referring to the following detailed description of the preferred embodiments and the accompanying drawings, wherein

FIGS. 2A, 2B and 2C are top plan view, side sectional view, and front elevation, respectively, of a driven assembly for the heavy-duty body-turn-over apparatus of the present invention;

FIGS. 4A, 4b and 4C are top plan view, side sectional view, and front elevation, respectively, of a driven assembly for the light body-turn-over apparatus of the present invention;

DETAILED DESCRIPTION OF THE PREFERRED EMBODIMENTS

Figure 1:
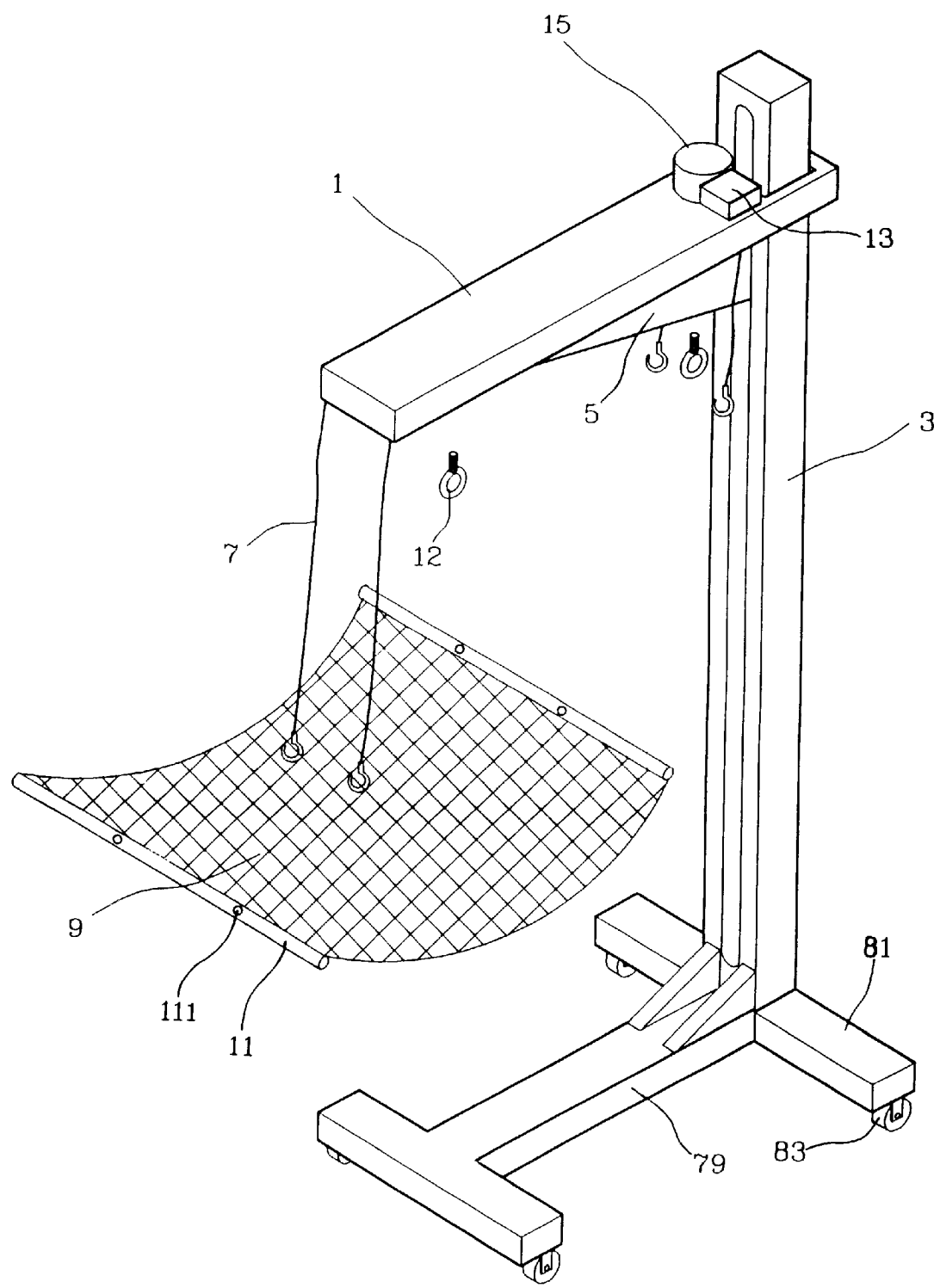
FIG. 1 is a perspective showing a heavy-duty body-turn-over apparatus according to the present invention.

Please refer to FIG. 1 which is a perspective showing a heavy-duty body-turn-over apparatus according to a first embodiment of the present invention. In this embodiment, the body-turn-over apparatus includes a driving mechanism 1 fixedly attached to a cantilever elevator 5 movably attached to one side of a fixed type elevator support 3. Four ropes 7 with hooks at their lower ends are separately hung from four bottom corners of the cantilever elevator 5 to connect a net 9 by hooking the hooks into connecting holes 111 provided on two bars 11 separately extending through two sides of the net 9. The elevator 5 may be adjusted in its height, so that the ropes 7 are in properly tensed condition. Rings 12 with screwed head may be mounted to reinforce the ropes 7, so that the apparatus may serve as a hoist to suspend a patient over the sick bed.

Please refer to FIGS. 2A to 2C. The driving mechanism 1 for the heavy-duty body-turn-over apparatus includes a controller 13. Instructions may be given via the controller 13 to start a motor 15 and a reduction gearbox 17 to drive a driven assembly 19. The driven assembly 19 includes a screw stem 191 around which an internally threaded collar 21 is mounted. A shaft 23 has two ends projected from two sides of the collar 21 to connect two wheels 25 thereto. When the screw stem 191 is driven by the motor 15 and the reduction gearbox 17 to rotate, the collar 21 and accordingly the shaft 23 are brought to move forward or backward along the screw stem 191. At this point, the wheels 25 rotate to permit the collar 21 and the shaft 23 to move smoothly. The rope 7 each has one end connected to the shaft 23 and another end passing through a pulley 7 located at a corner of the driven assembly 19 to hang down from the pulley 27. Total pulleys 27 are provided. When the collar 21 and the shaft 23 move along a travel decided by the controller 13, the ropes 7 are pulled leftward or rightward and thereby alternately lift or loosen two sides of the net 9 connected to the ropes 7. Three limit switches, namely, left, middle, and right limit switches 109, 105 and 107 are provided in the travel of the driven assembly 19. When the driving mechanism 1 of the present invention is started or stopped, the collar 21 is located at a middle point of the screw stem 191. And, when the collar 21 is moved to the utmost left or right end of the screw stem 191, the left or the right limit switch 107 or 109 will cause the screw stem 191 to rotate in reverse direction and the collar 21 to move in an opposite direction.

Figure 3:
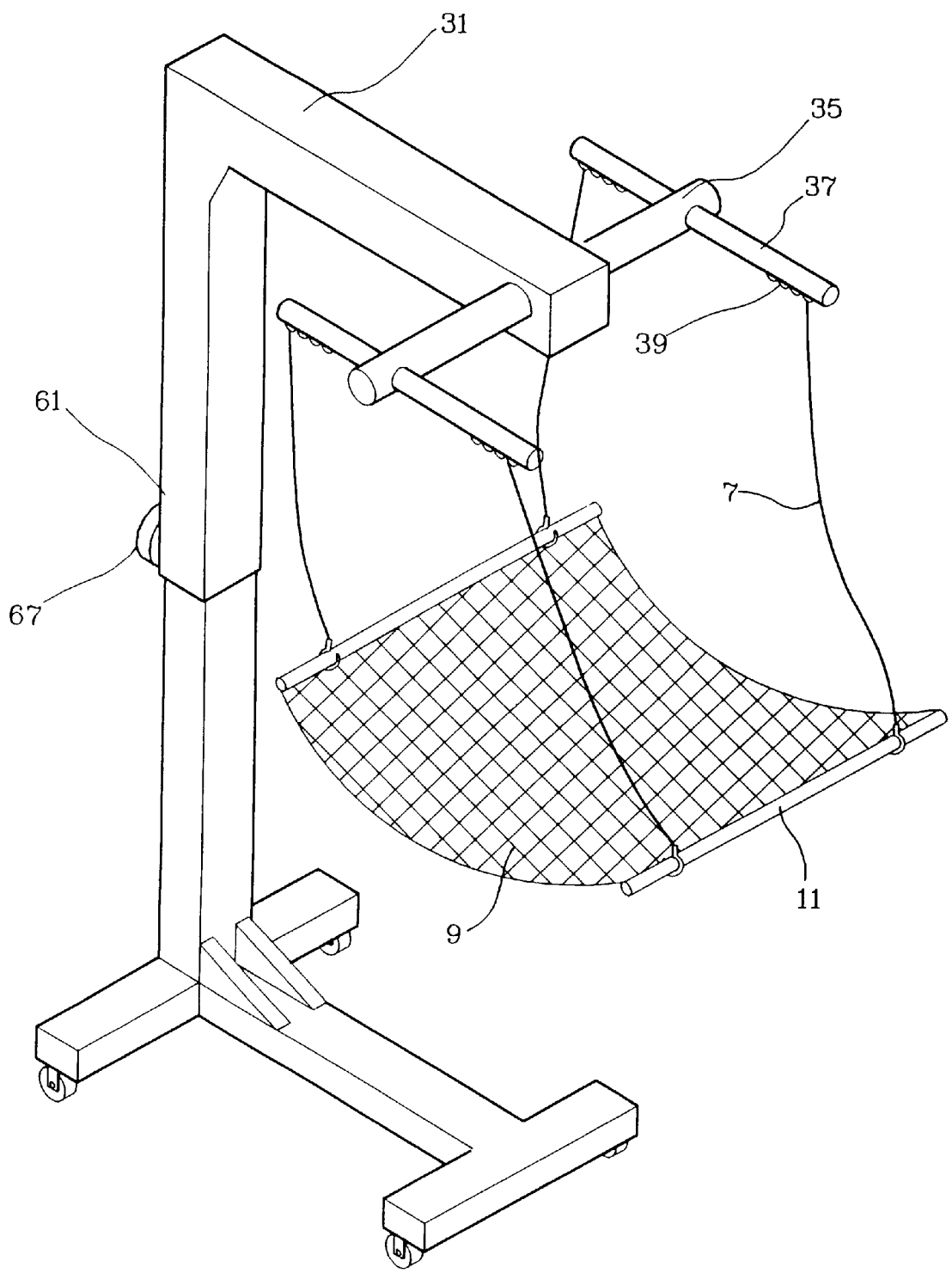
FIG. 3 is a perspective showing a light body-turn-over apparatus according to the present invention.

FIG. 3 illustrates a light body-turn-over apparatus according to a second embodiment of the present invention. In this embodiment, the body-turn-over apparatus includes a driving mechanism 31 fixedly attached to a top of a telescopic type elevator support 61. A shaft 35 is transversely connected to a front end of a driven assembly 4. The shaft 35 is provided at each outer end with two arms 37 perpendicular to and projecting from the shaft 35 in opposite directions. Each arm 37 is provided near a free end with a row of adequately spaced hangers 39. Ropes 7 symmetrically hang from the arms 37 with upper ends connected to four selected hangers 39 and lower ends to the bars 11 of the net 9. By symmetrically connecting the ropes 7 to different hangers 39 on the arms 37, the net 9 may have different stretching width.

As shown in FIG. 4A to 4C, the driving mechanism 31 includes a controller 41. Instructions may be given via the controller 41 to start a motor 45 and a reduction gearbox 47 to drive a driven assembly 4. The driven assembly 4 includes an internally threaded sleeve 49 which is rotated by starting the motor 45 and the reduction gearbox 47 to cause a screw stem 51 axially mounted to a front end of the sleeve 49 to move forward or backward relative to the sleeve 49. A coupling head 55 is connected to a front end of the screw stem 51. A push bar 53 is fixedly connected at a root portion to a middle section of the shaft 35, so that the shaft 35 moves along with the push bar 53. The coupling head 55 is movable along a sliding slot 57 formed on the push bar 53. Whereby when the screw stem 51 is driven by the rotating sleeve 49 to move forward or backward, the coupling head 55 simultaneously slides in the sliding slot 57 to shift the push bar 53 forward or backward within ranges defined by three limit switches, namely, left, middle, and right limit switches 109, 105, and 107 provided around the shaft 35. When the push bar 53 shifts, it simultaneously brings the shaft 35 to turn. At this point, the arms 37 at two sides of the shaft 35 swing up and down like a seesaw to pull upward or lower the ropes 7 connected to the hangers 39, causing two sides of the net 9 to be lifted and lowered alternately in a regular manner.

Figure 5:
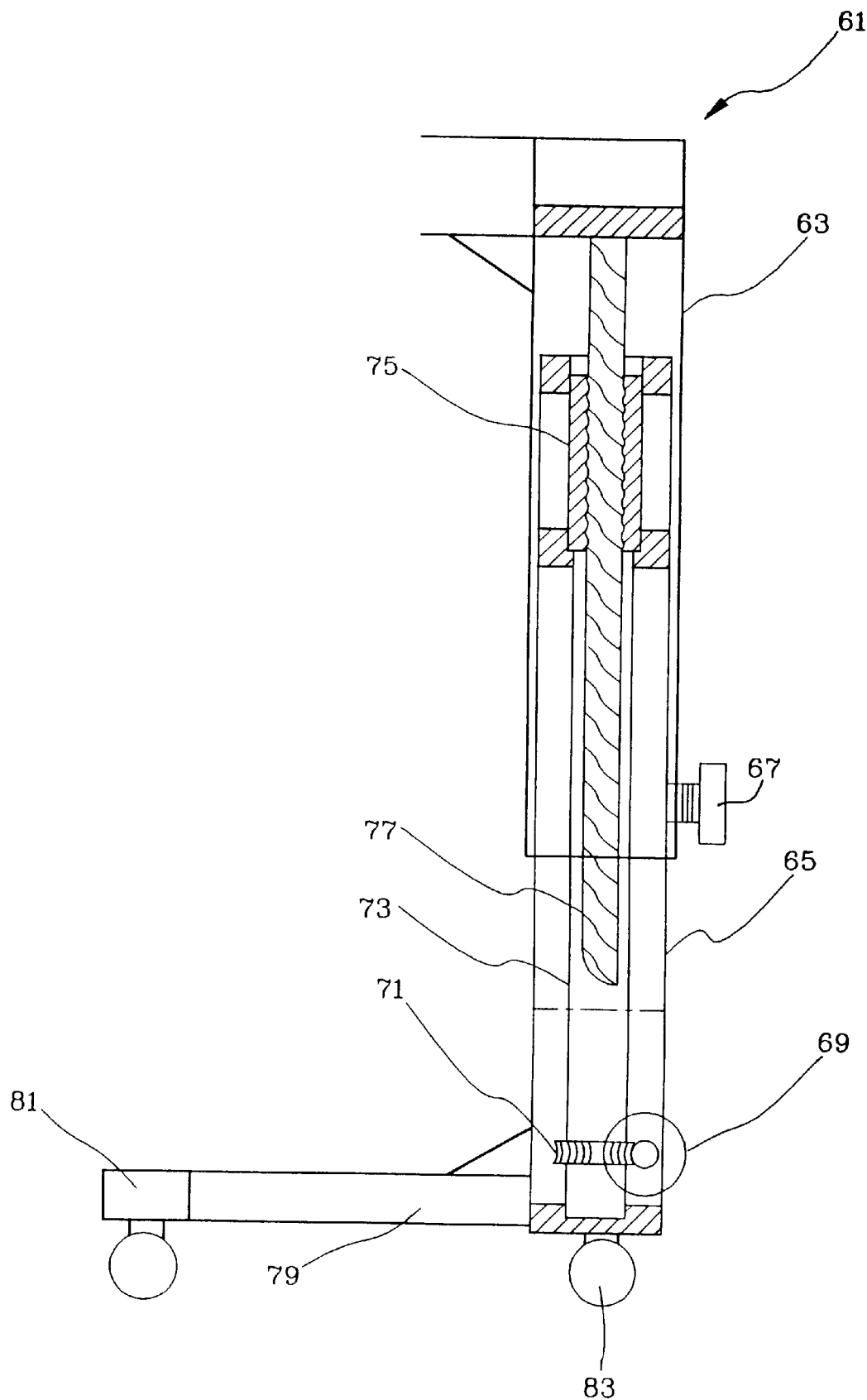
FIG. 5 is a side sectional view of a telescopic type elevator support for the light body-turn-over apparatus of the present invention.

FIG. 5 is a side sectional view of the telescopic type elevator support 61 for the light body-turn-over apparatus of the present invention. As shown, the telescopic type elevator support 61 includes a female section 63 put around a male section 65, an H-shaped stand formed from a middle transverse beam 79 and two longitudinal beams 81 fixed to two ends of the transverse beam 79, and four lockable wheels 83 separately mounted to bottom ends of the longitudinal beams 81. When an adjusting knob 67 on the female section 63 is loosened from the female section 63 and a motor 69 and a reduction gearbox 71 are started to rotate a sleeve 73 inside the elevator support 61 and connected at one lower end to the reduction gearbox 71, an internally threaded collar 75 connected to an upper end of the sleeve 73 rotates along with the sleeve 73. A screw stem 77 having an upper end connected to the female section 63 extends into the sleeve 73 and engages with the threaded collar 75. When the collar 75 rotates along with the sleeve 73, the screw stem 77 and accordingly the female section 63 are caused to move up or down relative to the male section 65. When the female section 63 is moved to a desired height relative to the male section 65, the adjusting knob 67 is tightened against the female section 63 again.

Figure 6:
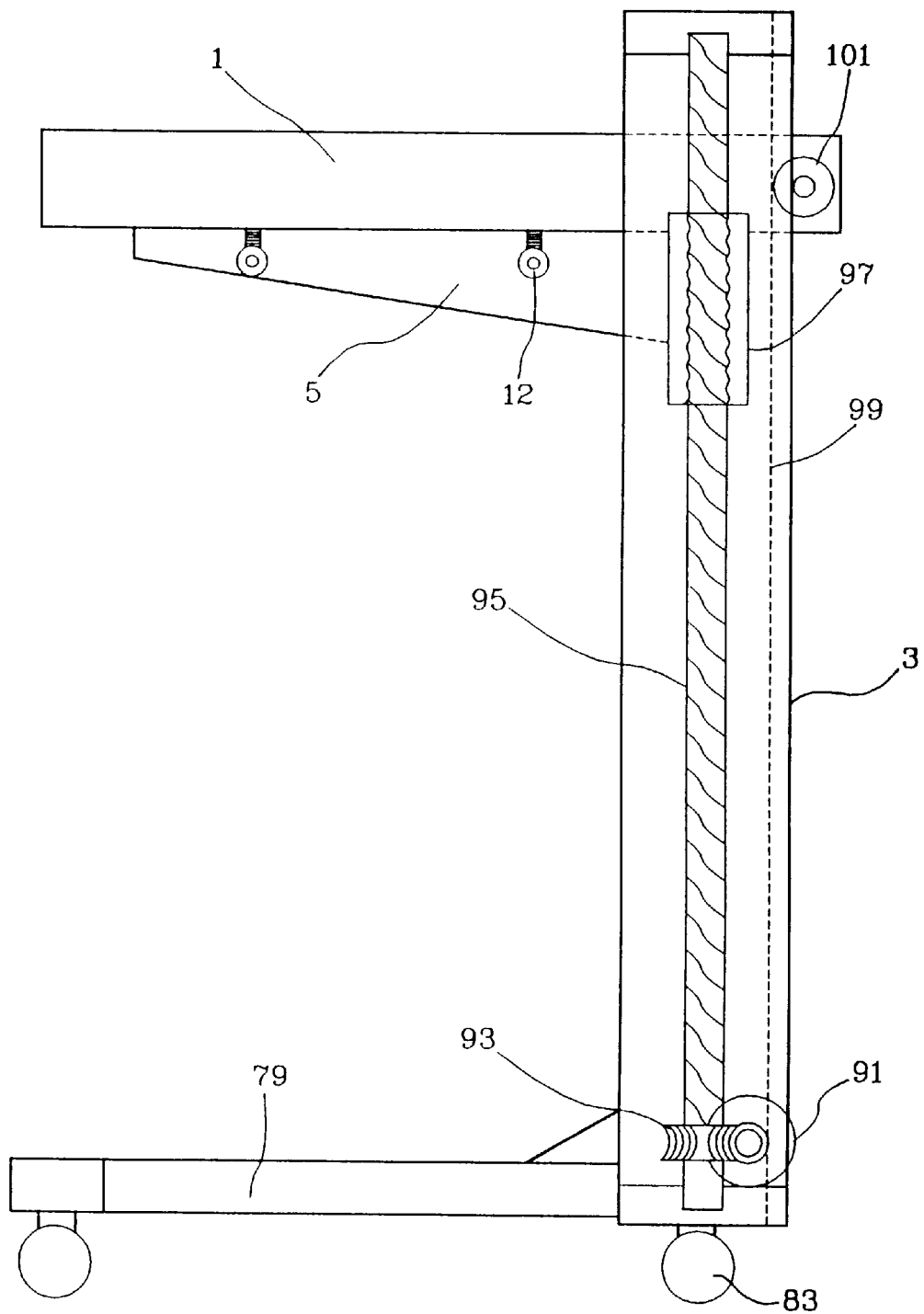
FIG. 6 is a side sectional view of a fixed type elevator support for the heavy-duty body-turn-over apparatus of the present invention.

Please now refer to FIG. 6 which is a side sectional view of the fixed type elevator support 3 for the heavy-duty body-turn-over apparatus of the present invention. As shown, the elevator support 3 has a screw stem 95 mounted therein. An internally threaded collar 97 is engaged around the screw stem 95. When the screw stem 95 is rotated by a motor 91 and a reduction gearbox 93 in the elevator support 3, the collar 97 is caused to move up or down along the screw stem 95. The cantilever elevator 5 is fixedly connected to the collar 97 to move up and down with the collar 97. The driving mechanism 1 adopted in the heavy-duty body-turn-over apparatus of the present invention is fixedly attached to the elevator 5 to move along with the elevator 5. A roller 101 provided at a rear end of the driving mechanism 1 rotates along a rail 99 in the elevator support 3 to help the driving mechanism 1 to slide smoothly up and down. The elevator support 3 has a stand and wheels similar to that of the telescopic type elevator support 61 and are therefore not repeatedly described herein.

Figure 7:
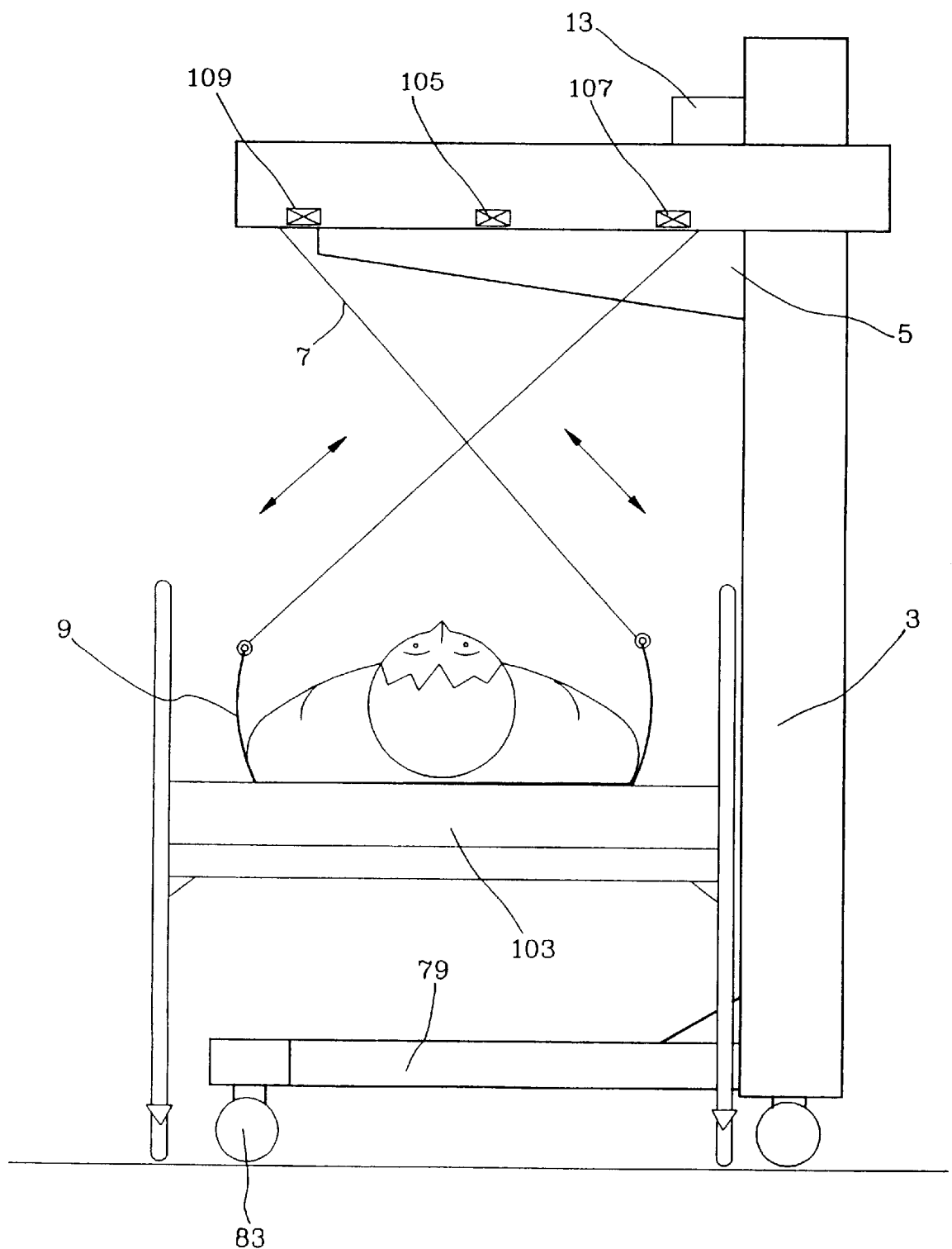
FIG. 7 schematically illustrates the clinical operation of the heavy-duty body-turn-over apparatus of the present invention.

FIG. 7 schematically illustrates the heavy-duty body-turn-over apparatus of the present invention being employed to help a patient turn over on a sick bed 103. To do so, a washable net 9 is spread over a mattress of the sick bed 103. Connect lower ends of the ropes 7 to the bars 11 at two sides of the net 9. Adjust the elevator 5 to a desired height relative to the sick bed 103, so that the ropes 7 are properly tensioned to decide an angular extent to which the patient is turned over on the sick bed 103. Then, the motor 15 is started and the shaft 23 moves from the middle limit switch 105 toward the right limit switch 107. The shaft 23 moves in reverse direction toward the left limit switch 109 when it reaches the right limit switch 107. The shaft 23 moves toward the left limit switch 107 again when it reaches the right limit switch 109. The shaft 23 reciprocates until a set time period is reached. The shaft 23 will then return to its home position at the middle limit switch 105 and automatically stop moving. A speed at which the shaft 23 is moved and a time period for which the shaft 23 is paused at turning can both be set and adjusted via the controller 13.

Figure 8:
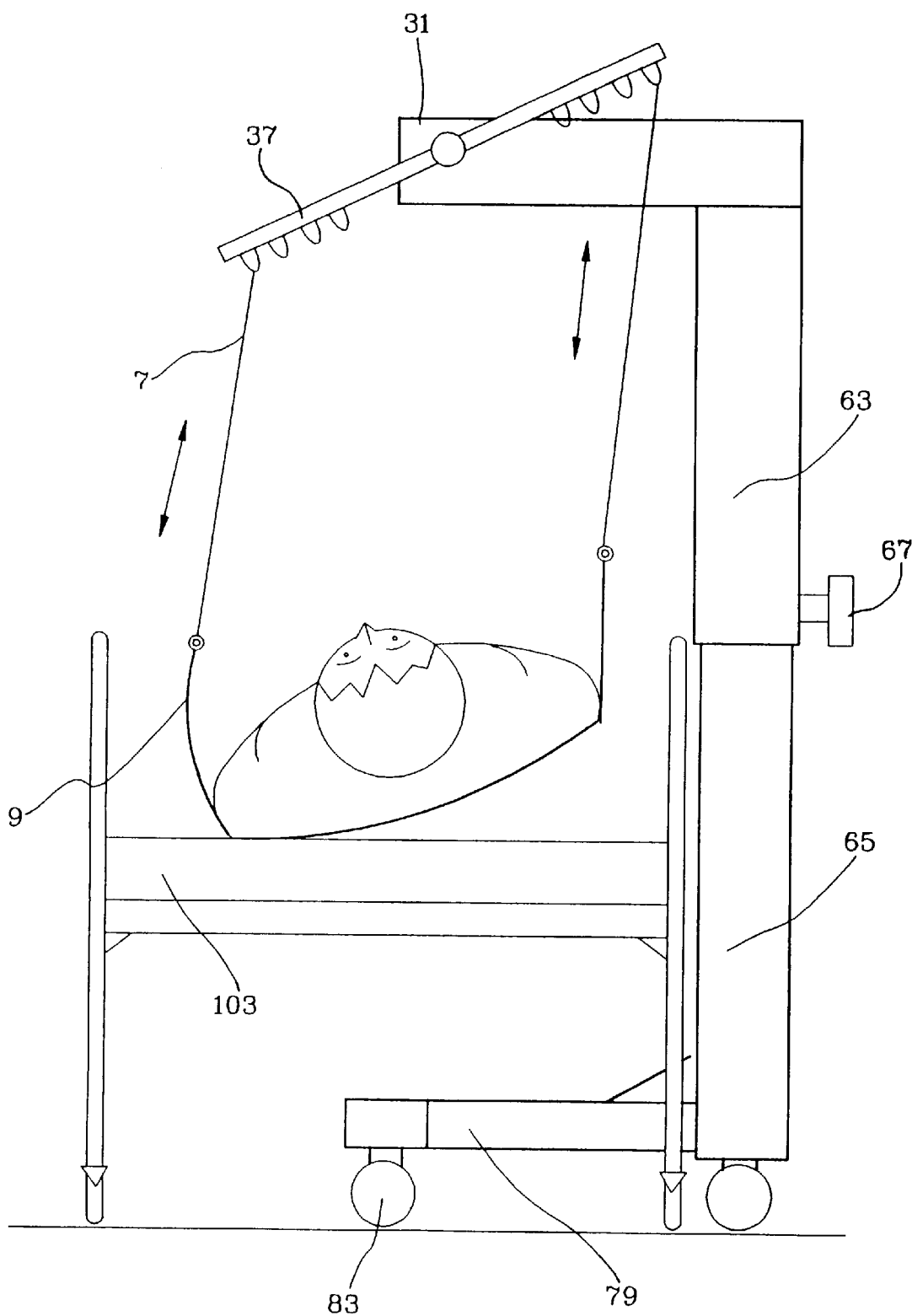
FIG. 8 schematically illustrates the clinical operation of the light body-turn-over apparatus of the present invention.

FIG. 8 schematically illustrates the light body-turn-over apparatus of the present invention being employed to help a patient turn over on a sick bed 103. When the arms 37 swing up and down to pull up or lower the ropes 7 relative to the sick bed 103, the net 9 connected at two bars 11 to the ropes 7 shall bring the patient lying on the net 9 to turn sideward to a desired extent. The clinical operation of the light body-turn-over apparatus is similar to that shown in FIG. 7 and is therefore not repeated herein.

Figure 9:
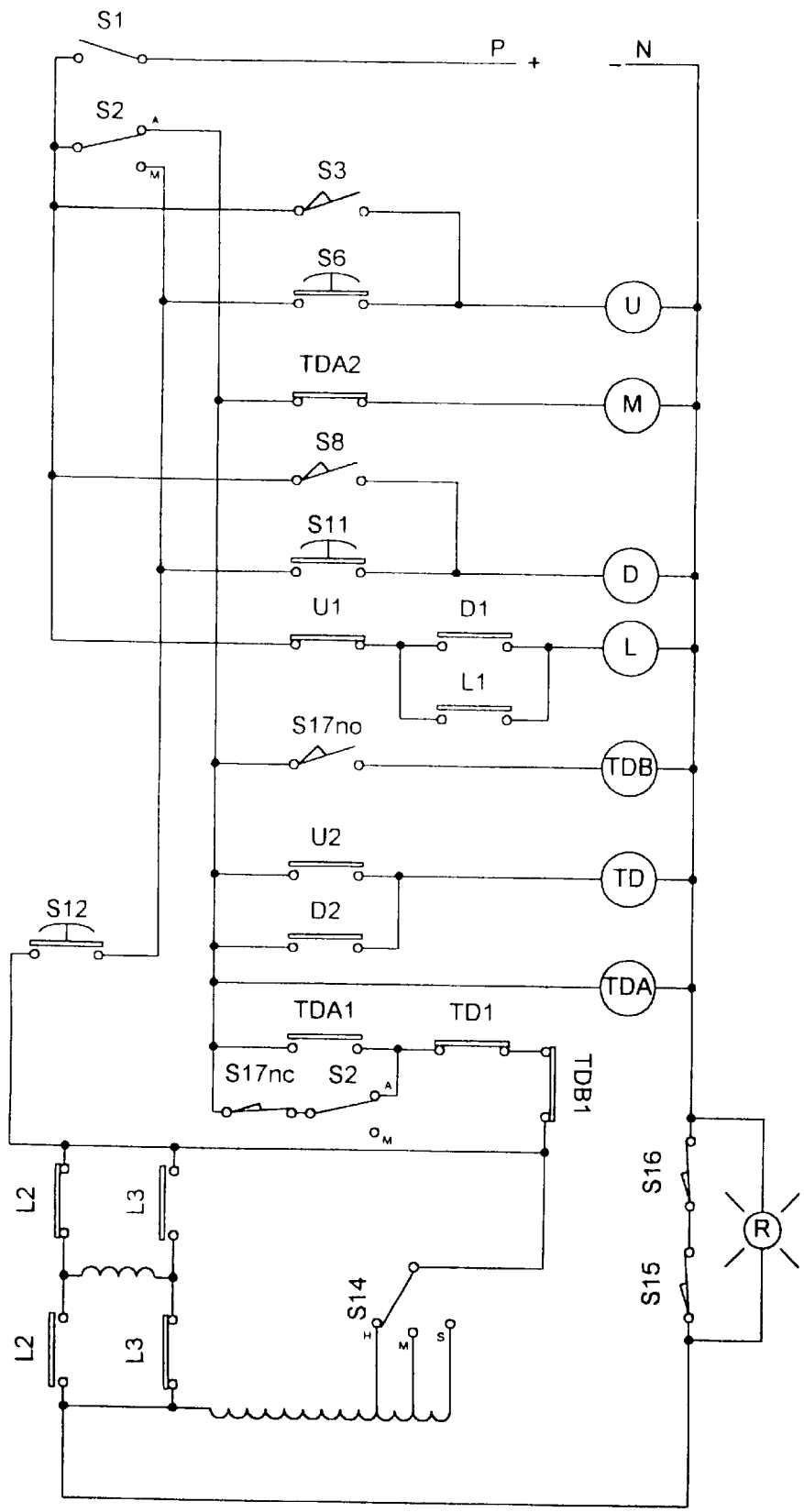
FIG. 9 is a control circuit diagram of the present invention.

FIG. 9 is a control circuit diagram for the body-turn-over apparatus of the present invention. As shown, the control circuit includes a power switch S1, an operation mode switch S2, a left limit switch S3, a manual setting switch S6 for moving rightward, a right limit switch S8, a manual setting switch S11 for moving leftward, an inching switch S12, a speed selection switch S14, a right-moving switch relay U, a left-moving switch relay D, a motor reversing relay L, a music bell relay M, a pause relay TD, a timer TDA, an exciting self-protective switch L1, a motor primary coil M1, a motor starting coil M2, and a middle pause relay TDB. The operation mode switch S2 allows an operator to select an automatic or a manual operation mode of the apparatus. When the apparatus is operated in the manual mode, the movement of the shaft of the driven assembly is not limited by the middle switch 105.

A user may select to have the body-turn-over apparatus of the present invention automatically or manually operated.

To manually operate the body-turn-over apparatus, first switch the operation mode switch S2 to "M". Depress the setting switch S6 to select moving rightward or the setting switch S11 to moving leftward. Then, adjust the speed selection switch S14 to select a desired speed. At this point, the body-turn-over apparatus may operate at the set speed and in the set direction. When the inching switch S12 is depressed, the apparatus may be controlled to move inch by inch.

To have the body-turn-over apparatus automatically operated, first switch the operation mode switch S2 to "A". In the case of heavy-duty body-turn-over apparatus, the shaft 23 will automatically stop at a middle point of the screw stem 191 of the driven assembly 19. Adjust the speed selection switch S14 to set a desired speed and the pause relay TD to set time of pause before the shaft 23 moves in an opposite direction. Finally, set the timer TDA to a desired operation time period. Then, the shaft 23 of the body-turn-over apparatus starts to reciprocate until the set operation time is reached. At this point, the apparatus is automatically reset to a middle positioning switch S17 and the shaft 23 stops at the middle point of its travel. Meanwhile, a music bell is caused to ring.

Alternatively, the controller 13 may be so designed that an operating time of the motor controlled or adjusted by a microcomputer can be counted and converted into a moving distance of the shaft 23 or a swing angle of the arms 37 caused by the driving mechanism 1 or 31, respectively. Whereby, whenever the shaft 23 or the arms 37 are moved to a middle inductive switch, the controller of the apparatus is automatically reset to zero and the counting of the operating time starts from zero again.

The net 9 is preferably made of pliable, air-pervious and washable material. The bars 11 are preferably fixed to two longitudinal sides of the net 9. Connecting holes 111 for connecting the ropes 7 to the net 9 are preferably spaced on the bars 11 near middle portions thereof, so that a patient lying on the net 9 may be indirectly brought to a suspended position above the sick bed.

Alternatively, two grip bars 14 may be connected to the ropes 7 at two sides of the sick bed 103, so that a patient lying on the sick bed may grip the bars 14 or rest two legs on the bars 14 to do rehabilitation exercises. Or, fracture fixation means may be associated with the ropes 7 for necessary skeletal traction.

With the above arrangements, there are at least a heavy-duty and a light body-turn-over apparatus available from the present invention. In either type, the present invention may be freely moved to use with different sick beds. Moreover, the present invention can be used to effect multiple functions, including sideward turning the patient's body, helping the patient to do rehabilitation exercises or proceed skeletal traction, etc., and is therefore practical and economical in use.

What is to be noted is the form of the present invention shown and disclosed is to be taken as a preferred embodiment of the invention and that various changes in the shape, size, and arrangements of parts may be resorted to without departing from the spirit of the invention or the scope of the subjoined claims.

What is claimed is:

1. A multipurpose body-turn-over apparatus, comprising an elevator support, a cantilever elevator horizontally extended from one side of said elevator support and supporting a driving mechanism fixedly mounted thereon, said driving mechanism including a controller, a motor, a reduction gearbox, and a driven assembly having two ends; ropes having one upper end connected to said driven assembly and another lower end provided with hooks hanging from said two ends of said driven assembly, and limit switches being mounted at predetermined positions on a travel of said driven assembly; whereby when said driving mechanism is actuated by starting said motor and said reduction gearbox, said driven assembly is driven to reciprocate to cause said ropes at said two ends of said driven assembly to alternately ascend or descend within a distance defined by said limit switches, and whereby either a net or other medical treating means may be connected to lower ends of said ropes via said hooks to help turn a patient over on the net to avoid bedsore, to help the patient do rehabilitation exercises, or to suspend a part of the patient, such as a broken leg, as necessary.

2. A multipurpose body-turn-over apparatus as claimed in claim 1, wherein said driven assembly reciprocates in a linear movement and includes a screw stem connected at a rear end to said reduction gearbox to be rotated by said motor, an internally threaded collar put around said screw stem, a shaft perpendicular to said screw stem with two ends extending from two sides of said screw stem in opposite directions, and two wheels connected to said two ends of said shaft to rotate when said screw stem is rotated to bring said shaft and said collar to move along said screw stem; each end of said shaft having two of said ropes connected thereto to extend in opposite directions, each said rope passing a pulley to hang down from one corner of said cantilever elevator, and said limit switches being preferably mounted at two ends and a middle point of the travel of said driven assembly for said wheels connected to said shaft to reverse or reset when they reach points limited by said limit switches.

3. A multipurpose body-turn-over apparatus as claimed in claim 1, wherein said driven assembly reciprocates to swing two pairs of arms for holding said ropes and includes an internally threaded sleeve connected at a rear end to said reduction gearbox and at a front end to a screw stem, and a push bar slidably connected at a free end to a front end of said screw stem and fixedly connected at a root portion to a shaft which extends perpendicularly to said driven assembly and therefore said cantilever elevator; each end of said shaft having a pair of said arms perpendicularly connected to said shaft and extending in opposite directions, said arms having hangers provided near outer ends for said ropes to hang therefrom; and wherein said limit switches are provided around said shaft at predetermined positions; whereby when said threaded sleeve is rotated by starting said motor and said reduction gearbox, said screw stem reciprocates to push or pull said push bar, causing said shaft to turn that in turn causes said arms extending from two ends of said shaft to swing within angles defined by said limit switches.

4. A multipurpose body-turn-over apparatus as claimed in claim 1, wherein said elevator support includes a female section and a male section telescopically received in the female section, said female section being adjustable in height relative to said male section by loosening and tightening again an adjusting knob extending through said female section to press against said male section, and wherein said elevator support includes a motor and a reduction gearbox mounted therein, a sleeve connected at a lower end to said reduction gearbox, an internally threaded collar connected to an upper end of said sleeve, and a screw stem extending in said sleeve to engage with said threaded collar and connected at an upper end to said female section, whereby when said adjusting knob is loosened and said motor and said reduction gearbox are started, said sleeve and said threaded collar are rotated to cause said screw stem to move up or down and thereby lifts or lower said female section relative to said male section to adjust a height of said cantilever elevator relative to a sick bed.

5. A multipurpose body-turn-over apparatus as claimed in claim 1, wherein said elevator support includes one single fixed column in which a motor, a reduction gearbox, a screw stem connected at a lower end to said reduction gearbox, an internally threaded collar put around said screw stem are mounted, and wherein said cantilever elevator is fixedly connected at one end to said threaded collar; whereby when said motor and said reduction gearbox are started to rotate said screw stem, said threaded collar moves up or down along said screw stem to bring said cantilever elevator and said driving mechanism and said driven assembly mounted on said cantilever elevator to move up or down at the same time.

6. A multipurpose body-turn-over apparatus as claimed in claim 4, wherein said elevator support includes an H-shaped stand formed from a transverse beam and two longitudinal beams connected to two ends of said transverse beam, and each of said longitudinal beams being provided at bottom side with two lockable wheels.

7. A multipurpose body-turn-over apparatus as claimed in claim 1 further includes a net, a pair of grip bars, and a fracture fixation means; said net being connected to lower ends of said ropes for supporting a patient thereon and being preferably made of pliable, air-pervious, and washable material, two bars being connected to two longitudinal sides of said net, and connecting holes being spaced on said bars to receive said hooks attached to lower ends of said ropes; said pair of grip bars being selectively connected at two ends to said ropes for a patient to grip or rest legs when doing rehabilitation exercises; and said fracture fixation means being suitable for connecting to said ropes for the purpose of skeletal traction and fracture fixation.

8. A multipurpose body-turn-over apparatus as claimed in claim 1, wherein said controller is a microcomputer-operated controller and wherein an operating time of said motor of said driving mechanism being controlled or adjusted by a microcomputer can be counted and converted into a moving distance of said driven assembly, whereby whenever said driven assembly is moved to an inductive switch at a middle point of its travel, said controller automatically resets to zero and counts the operating time of said motor from zero again.

9. A multipurpose body-turn-over apparatus as claimed in claim 5, wherein said elevator support includes an H-shaped stand formed from a transverse beam and two longitudinal beams connected to two ends of said transverse beam, and each of said longitudinal beams being provided at bottom side with two lockable wheels.

* * * * *